(12) United States Patent
Schumacher et al.

(10) Patent No.: US 6,797,350 B2
(45) Date of Patent: Sep. 28, 2004

(54) LINERLESS PRESSURE SENSITIVE COIL OF STAMPS HAVING PRIMER LAYER

(75) Inventors: Cheryl L. Schumacher, Tabernacle, NJ (US); Peter Moore, Clinton, CT (US); Henry B. Robbins, Madison, CT (US); William G. Gunther, Guilford, CT (US)

(73) Assignee: George Schmitt & Company, Inc., Branford, CT (US)

( * ) Notice: Subject to any disclaimer, the term of this patent is extended or adjusted under 35 U.S.C. 154(b) by 105 days.

(21) Appl. No.: 10/002,311

(22) Filed: Oct. 24, 2001

(65) Prior Publication Data

US 2002/0048675 A1 Apr. 25, 2002

Related U.S. Application Data

(60) Provisional application No. 60/243,160, filed on Oct. 25, 2000.

(51) Int. Cl.$^7$ ................................................. B32B 7/12
(52) U.S. Cl. .................... 428/40.1; 156/277; 156/278; 283/81; 428/41.7; 428/42.1; 428/42.2; 428/42.3; 428/192; 428/343; 428/352; 428/354; 428/906
(58) Field of Search ........................... 428/40.1, 42.1, 428/42.2, 42.3, 343, 354, 906, 41.7, 192, 352; 283/81; 156/277, 278

(56) References Cited

U.S. PATENT DOCUMENTS

| | | | | |
|---|---|---|---|---|
| 4,895,747 A | * | 1/1990 | Birkholz et al. | 428/40.9 |
| 5,492,733 A | * | 2/1996 | D'Anna | 427/517 |
| 5,569,515 A | * | 10/1996 | Rice | 428/40.5 |
| 5,661,099 A | * | 8/1997 | Mitchell | 503/201 |
| 5,663,227 A | * | 9/1997 | Birkholz | 524/262 |

* cited by examiner

*Primary Examiner*—Nasser Ahmad
(74) *Attorney, Agent, or Firm*—St. Onge Steward Johnston & Reens, LLC

(57) ABSTRACT

A coil of stamps is formed from a plurality of self-adhesive stamps detachably connected to each other end-to-end to form a continuous strip. Because the stamps include a primer layer, it is practicable to wind the strip about itself in spiral-like fashion. The strip also includes a portion adjacent to the inner end of the strip having a piece of liner material disposed thereon, and a portion having no liner material thereon, whereby the portion having no liner material thereon allows the strip to be wound directly onto itself. Preferably, the strip of stamps also includes a portion adjacent to the outer end of the strip having a piece of liner material disposed thereon in order to facilitate removal of the first stamp or group of stamps from the strip.

19 Claims, 5 Drawing Sheets

LINERLESS PRESSURE SENSITIVE COIL OF STAMPS HAVING PRIMER LAYER

RELATED APPLICATIONS

This application claims the benefit of, under 35 U.S.C. 119(e), U.S. Provisional Patent Application No. 60/243,160, filed Oct. 25, 2000.

FIELD OF THE INVENTION

The present invention relates to pressure sensitive stamps, and more particularly to a pressure sensitive stamp design which makes practicable rolling the stamps into a coil without providing a backing or liner on the entire coil by providing a primer layer.

BACKGROUND OF THE INVENTION

It has long been known to roll a strip of stamps into a coil to save space and to provide a convenient mechanism for detaching one or more stamps from a plurality of others. However, such a coil configuration has heretofore been limited to traditionally known stamps which required moistening on the glue side before being adhered to an envelope.

More recently, so-called "self adhesive" stamps have been becoming more and more popular. These stamps do not have to be moistened, but rather are provided with a pressure sensitive adhesive layer which is adhered to the envelope. The pressure sensitive adhesive layer is typically covered with a protective backing, or liner, consisting of a strip of non-adhesive material, generally of the same width as or wider than the strip of stamps, which is peeled away before the stamp is adhered to the envelope in order to expose the adhesive layer.

It has been proposed to roll such self-adhesive stamps into a coil in order to enjoy the convenience and space-saving characteristics associated therewith. However, when using known pressure sensitive adhesive stamp designs, doing so requires that the entire coil of stamps have a strip of protective liner backing the adhesive layer. This is true because if the liner layer were not present, the stamps, once rolled into a coil, would tightly adhere to themselves, thereby preventing the stamps from being unrolled. The cause of this undesirable phenomenon is described in more detail below.

Providing a liner for the entire coil of stamps, however, is undesirable for several reasons. One such reason relates to environmental concerns. The liner strip comprises unnecessary waste, which adversely impacts the environment. Moreover, the liner increases the material costs associated with manufacturing the stamps. Furthermore, when a liner is used, one is required to unroll a stamp off the coil, remove the stamp from the liner, and detach it from the next following stamp before adhering the stamp to the envelope. It would be easier for the user if the stamp could simply be unrolled, detached from the following stamp, and adhered to the envelope without having to remove a liner layer.

What is desired, therefore, is a stamp, a strip of which can be rolled into a coil, which includes a pressure sensitive adhesive layer for being adhered to an envelope, and which, when coiled, does not require a liner layer over the entire strip of stamps comprising the coil.

SUMMARY OF THE INVENTION

Accordingly, it is an object of the present invention to provide a stamp, a strip of which can be rolled into a coil.

Another object of the present invention is to provide a stamp having the above characteristics and which includes a pressure sensitive adhesive layer for being adhered to an envelope.

A further object of the present invention is to provide a stamp having the above characteristics and which when coiled, does not require a liner layer over the entire strip of stamps comprising the coil.

These and other objects of the present invention are achieved by provision of a coil of stamps formed from a plurality of self-adhesive stamps detachably connected to each other end-to-end to form a continuous strip of stamps. The strip is wound about itself in spiral-like fashion, and includes an inner end and an outer end. The strip of stamps includes a portion adjacent to the inner end of the strip having a piece of liner material disposed thereon, and a portion having no liner material thereon, whereby the portion having no liner material thereon allows the strip to be wound directly onto itself. Preferably, the strip of stamps also includes a portion adjacent to the outer end of the strip having a piece of liner material disposed thereon in order to facilitate removal of the first stamp or group of stamps from the strip of stamps.

Each of the plurality of self-adhesive stamps preferably comprises a paper layer having a first surface and an opposing second surface, a pressure sensitive adhesive layer adhered to the first surface of the paper layer, an ink layer disposed on at least portions of the second surface of the paper layer, a primer layer disposed on the ink layer and on any portions of the second surface of the paper layer not having the ink layer disposed thereon, and a silicone layer disposed on the primer layer. Most preferably, each of the plurality of self-adhesive stamps also includes a starch layer disposed between the first surface of the paper layer and the pressure sensitive adhesive layer. The primer layer is preferably at least partially absorbed by any portions of the second surface of the paper layer upon which the primer layer is disposed, whereby the paper layer is sealed, and preferably substantially none of the silicone layer is absorbed by the paper layer.

In another aspect, the present invention is directed to a system for packaging stamps, and is particularly well-suited for packaging the coils of stamps described above. The system is comprised of a plurality of coils of stamps aligned end-to-end along a longitudinal common axis, and a tube formed from a shrink-wrap material. The tube, which is shrink-wrapped around the plurality of coils of stamps, has a plurality of circumferential perforations therein, which perforations are located substantially adjacent to mating surfaces of adjacent coils of stamps for allowing coils of stamps to be separated from each other without removing the shrink-wrap material therefrom. The tube also includes at least one, and preferably two, longitudinal perforation for facilitating removal of the shrink-wrap material from the coils of stamps.

The invention and its particular features and advantages will become more apparent from the following detailed description considered with reference to the accompanying drawings.

DETAILED DESCRIPTION OF THE INVENTION

Figure 1:
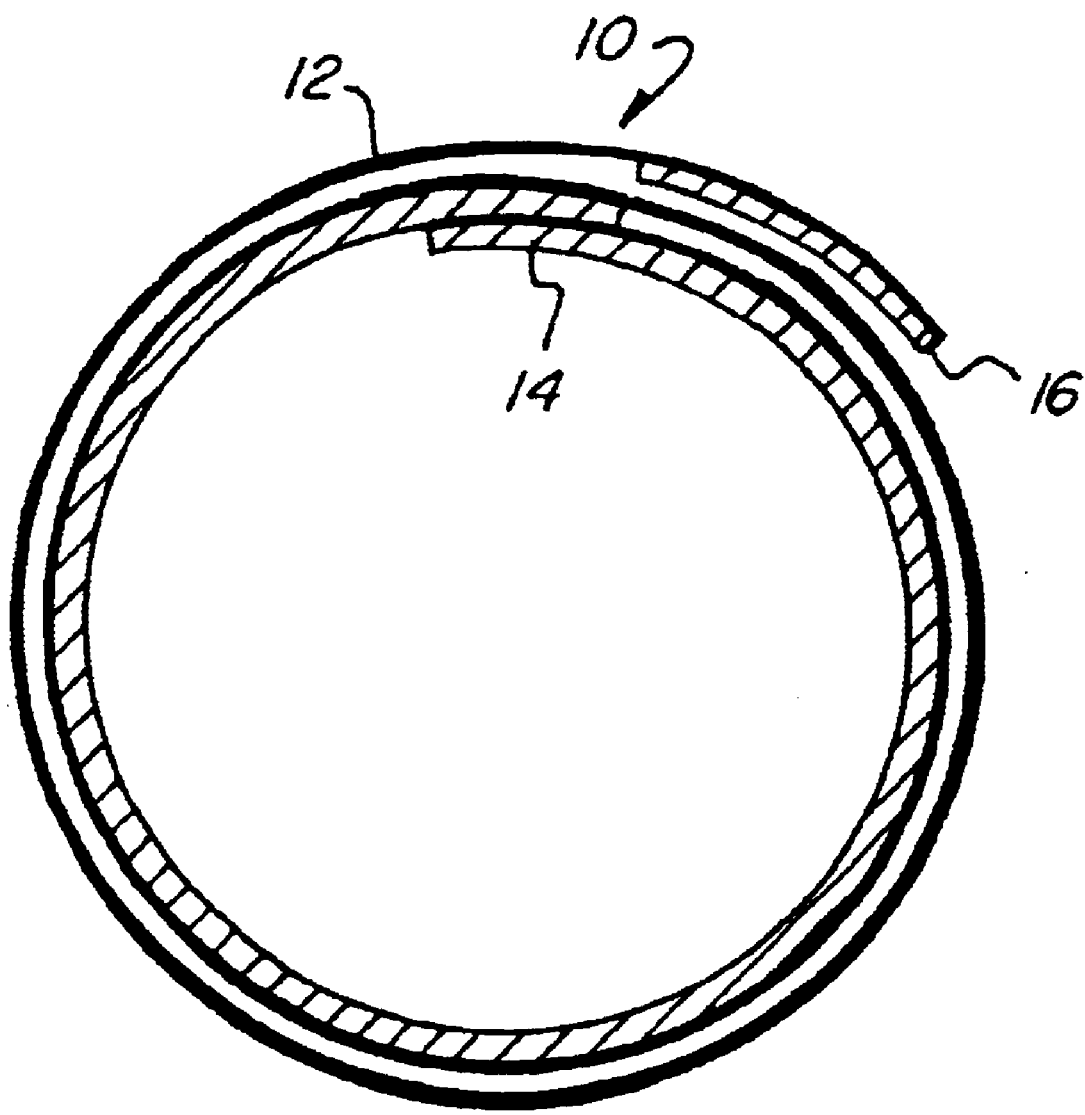
FIG. 1 is a side view of a linerless pressure sensitive adhesive coil of stamps in accordance with the present invention.

Referring first to FIG. 1, a coil 10 of stamps in accordance with the present invention is shown. Coil 10 comprises a continuous strip 12 of stamps rolled on itself, similar to a roll of tape. It should be noted that the strip 12 of stamps does not include a liner, or backing layer, protecting the pressure sensitive adhesive over its entire length. A piece of liner material 14 may be provided, however, at the center (i.e., the end) of coil 10 in order to inhibit lint, dirt, dust and the like from adhering to the stamps at the center of the coil, thereby preventing a sure adhesion of those stamps to the envelope at the time of use, and in order to meet security requirements imposed by the United States Postal Service or any other issuer of the stamps. A piece of liner material 16 may also be provided at the outer portion (i.e., the beginning) of coil 10 in order to facilitate removal of the first stamp or first few stamps from the strip 12 of stamps. However, it should be noted that as the strip 12 of stamps may be several yards, or more, in length the sections of the strip 12 which include a liner layer are relatively very small.

It has been found that a strip of known "self adhesive" stamps cannot be rolled onto itself without providing a liner over the entire strip of stamps. This is true because if the liner layer were not present, the stamps, once rolled into a coil, would tightly adhere to themselves, thereby preventing the stamps from being unrolled. The cause of this problem is illustrated in FIGS. 2 and 3.

Figure 2:
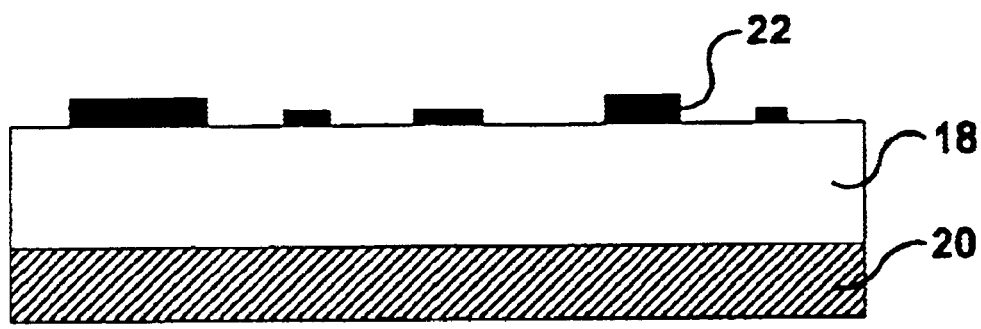
FIGS. 2 and 3 are side, partially cross-sectional views illustrating problems associated with the prior art.
Figure 3:
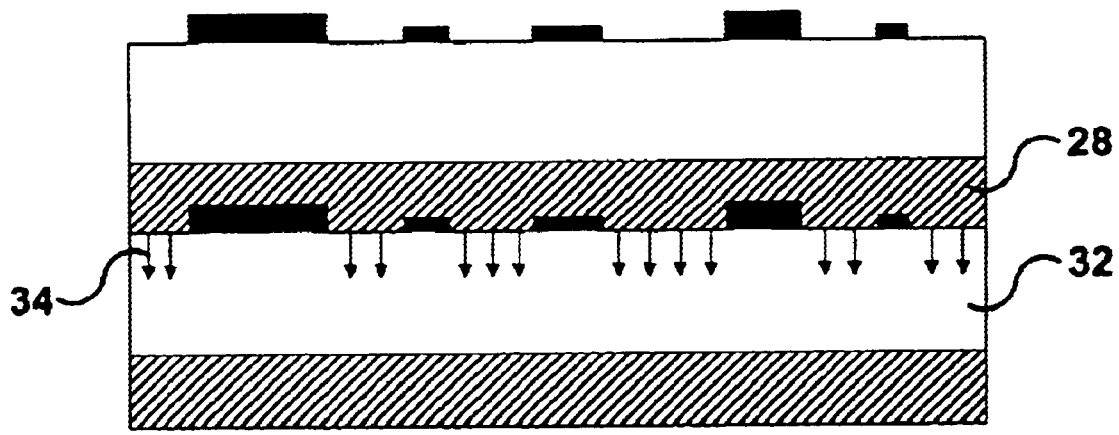

Referring first to FIG. 2, it is known to create a stamp from a paper layer 18, with a pressure sensitive adhesive layer 20 adhered to a rear side thereof, and an ink layer 22 provided on a front face thereof in order to provide a design. While such a production method has historically been acceptable in traditional stamps which have a liner, this method results in particular problems if the stamps are wound into a coil on themselves. As illustrated in FIG. 3, when one stamp is placed on top of another, the adhesive layer 28 of the top stamp directly contacts the front face of the lower stamp. As can be seen, the adhesive layer 28 may contact and adhere to the upper surface of paper 32 (illustrated by arrows 34). This adherence makes it difficult, if not impossible, to unroll stamps from the coil without damaging the upper stamps, the lower stamps, or both. The present invention remedies this problem.

Figure 4:
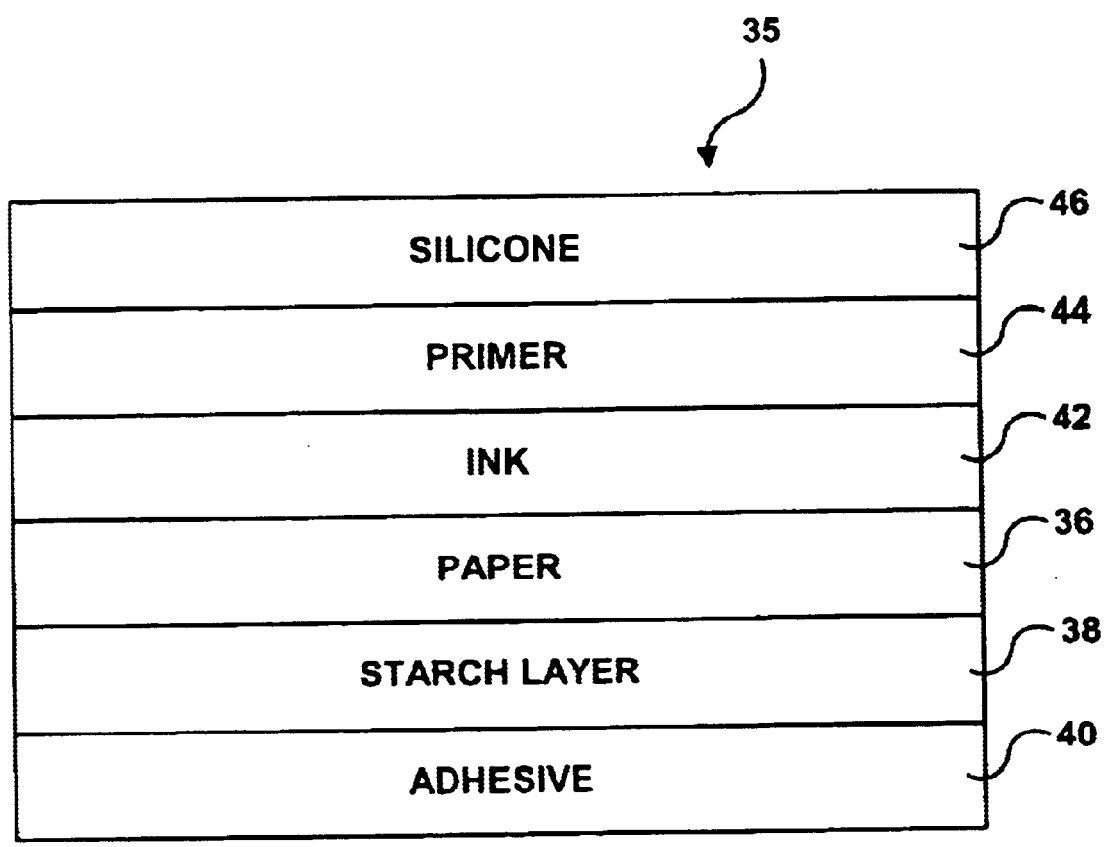
FIG. 4 is a schematic view illustrating a stamp in accordance with the present invention.
Figure 5:
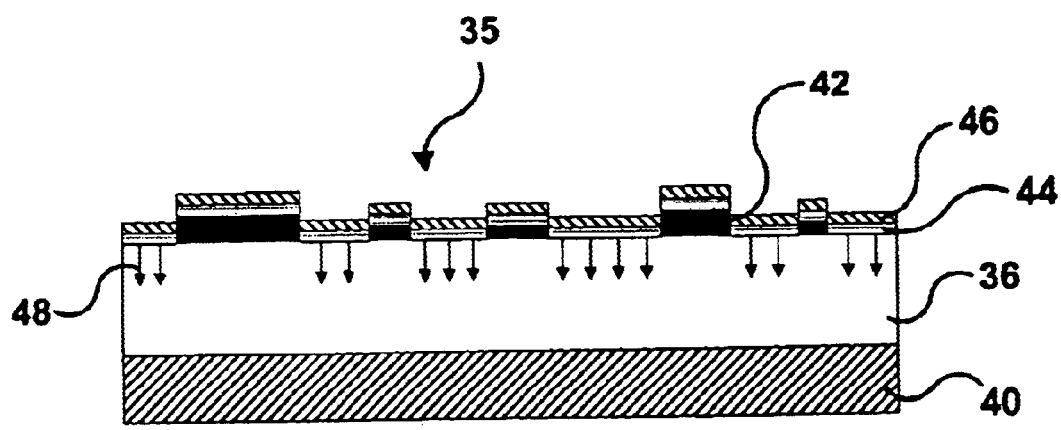
FIGS. 5 and 6 are side, partially cross-sectional views illustrating the stamp of FIG. 3.
Figure 6:
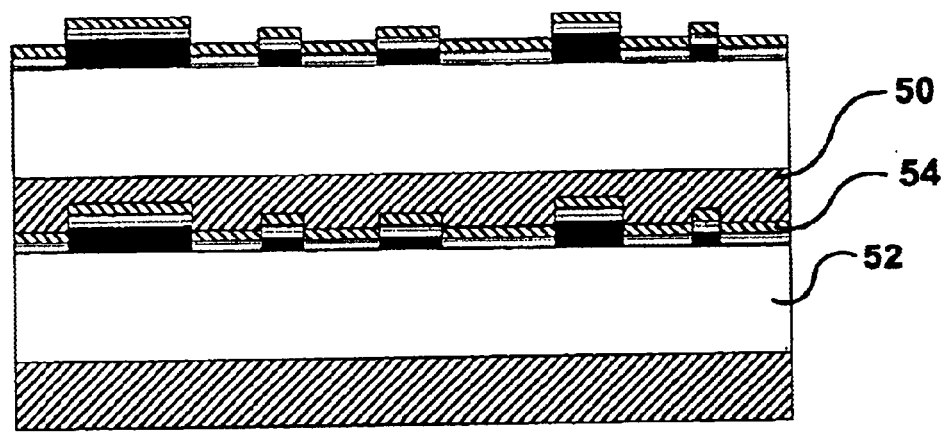

Referring now to FIGS. 4–6, a stamp 35 in accordance with the present invention is shown. Stamp 35 comprises a paper layer 36 having disposed on a rear face thereof a starch layer 38 and a pressure sensitive adhesive layer 40. On a front face of paper layer 36, ink 42 is applied, typically to create a design. In accordance with one novel aspect of the invention, a primer layer 44 is then applied before a silicone layer 46.

As best seen in FIG. 5, when the primer is applied, the primer is at least partially absorbed (indicated by arrows 48) into paper layer 36, while also creating a primer layer 44 on top of ink 42 and paper layer 36, thereby effectively sealing paper layer 36. Now, when the silicone layer 46 is applied, not only does the silicone create a discrete layer on top of the areas of the ink layer 42, but it also creates a discrete layer on top of the areas of paper layer 36. This is caused by the primer layer 44 having sealed paper layer 36 such that substantially no silicone is absorbed therein. Now, as seen in FIG. 6, when one stamp is placed on top of another, the adhesive layer 50 of the top stamp does not directly contact the paper layer 52 of the lower stamp. Instead, the adhesive layer 50 of the top stamp contacts only the silicone layer 54 of the bottom stamp. As the adhesive does not readily tightly adhere to the silicone layer, the top stamp may be readily and conveniently unrolled from the coil of stamps.

In another aspect, the coil of stamps of the present invention is conducive to a novel method of packaging and storage. Traditionally, coils of stamps had been packaged in trays, wherein each coil was individually packaged in a separate cell of the tray. The trays typically would be distributed to U.S. Post Office branch locations, where they would be stored in drawers. When a customer purchased a coil, the cell could be separated from the tray, and given to the customer.

The above-described packaging system, however, suffers from a number of disadvantages. One of these disadvantages relates to the space required for storage. Typically, because of the size of the trays, very few of them could be fit into the drawers, and in some cases, it may be difficult to even fit a single tray into a drawer. This would require postal employees to frequently be required to restock the drawers, a time-wasting process. Moreover, the large size of the trays increases shipping charges from manufacturing facilities to Post Office branch offices. Another disadvantage relates to the amount of material required to form the trays. The large amount of material makes the trays relatively costly to produce, and creates environmental concerns.

Figure 7:
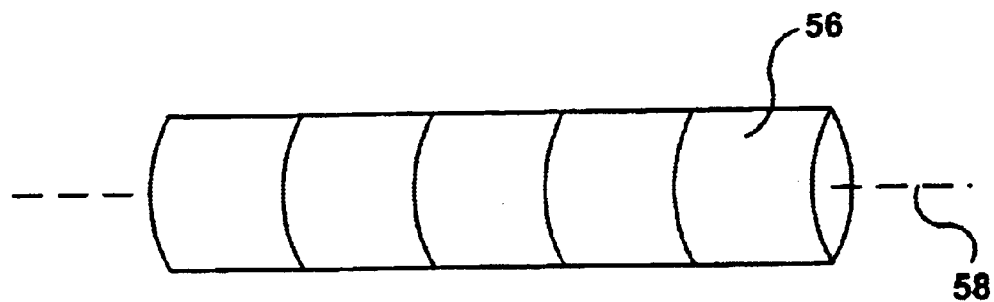
FIG. 7 is a side isometric view illustrating a packaging arrangement of a plurality of coils of stamp in accordance with another aspect of the present invention.
Figure 8:
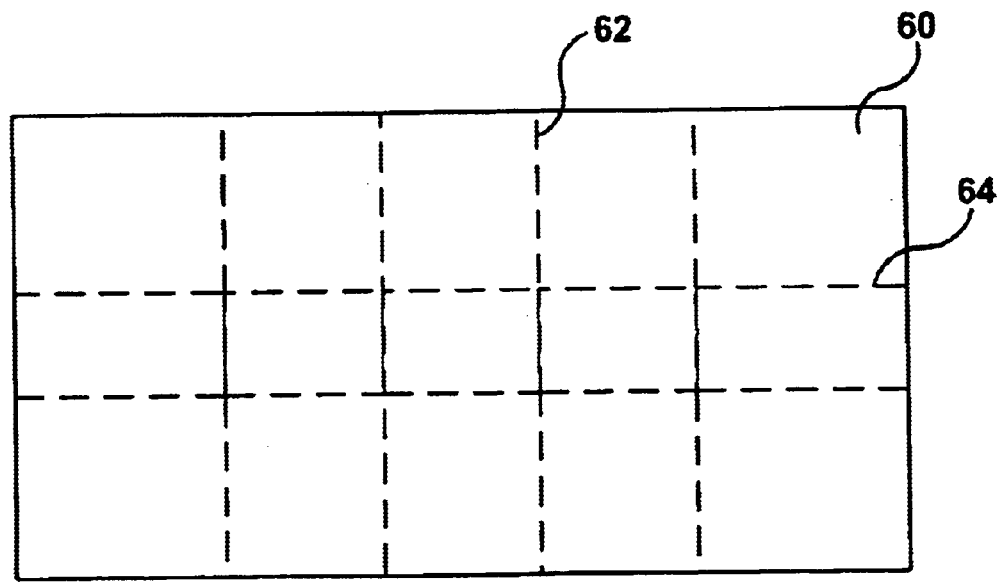
FIG. 8 is a plan view illustrating a sleeve used in the packaging arrangement of FIG. 7.

Referring now to FIGS. 7 and 8, a novel packing system in accordance with the present invention is shown. Referring first to FIG. 7, a cylinder or stick of coils 56 of stamps are shown in alignment along a common axis 58. The cylinder is wrapped with a shrink wrap tubing 60 (better seen in FIG. 8), and then heat is applied to shrink the tubing to mold to stamp coils 56, thereby holding the coils together in a cylinder.

Shrink wrap tubing 60 comprises a single piece of shrink wrap material having a plurality of lateral perforation lines 62 therein, and at least one longitudinal perforation line 64 therein. Lateral perforation lines 62 are placed so as to be adjacent to the mating surfaces of adjacent coils 56 once tubing is shrunk therearound. This allows one or more stamp coils 56 to be separated from the stick or strip, while the portion of shrink wrap tubing 60 around the respective coils remains intact. The number of lateral perforation lines 62 provided is dependent upon the number of stamp coils 56 to be packaged together. Although five coils are shown in the figures, it should be understood that a greater or fewer number of coils may be provided. Longitudinal perforation lines 64 are provided so that shrink wrap tubing may be easily removed from stamp coils 56 when such is desired. Although one longitudinal perforation line 64 is sufficient for such, it has been found that providing two longitudinal perforation lines 64 provides improved results.

Using the above-described packaging system, it has been found that twice as many coils of stamps can be stored in the space utilized by the known tray designs.

The present invention, therefore, provides a stamp, a strip of which can be rolled into a coil, which includes a pressure sensitive adhesive layer for being adhered to an envelope, and which, when coiled, does not require a liner layer over the entire strip of stamps comprising the coil.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A coil of stamps formed from a plurality of stamps detachably connected to each other end-to-end to form the coil, the coil having an inner end and an outer end, each of the plurality of stamps comprising:
   a paper layer having a first surface and an opposing second surface;
   an adhesive layer adhered to the first surface of said paper layer;
   a backing layer applied to said adhesive layer only if the stamp is within an area adjacent to the inner end of the coil, there being no backing layer applied if the stamp is within areas not so adjacent to the inner end of the coil;
   an ink layer disposed on at least portions of the second surface of said paper layer;
   a primer layer disposed on said ink layer and on any portions of the second surface of said paper layer not having said ink layer disposed thereon; and
   a silicone layer disposed on said primer layer.

2. The coil of stamps of claim 1 wherein each of the plurality of stamps further comprises a starch layer disposed between the first surface of said paper layer and said adhesive layer.

3. The coil of stamps of claim 1 wherein said adhesive layer comprises a pressure sensitive adhesive layer.

4. The coil of stamps of claim 1 wherein said primer layer is at least partially absorbed by any portions of the second surface of said paper layer upon which said primer layer is disposed, whereby said paper layer is sealed.

5. The coil of stamps of claim 1 wherein substantially none of said silicone layer is absorbed by said paper layer.

6. A coil of stamps formed from a plurality of stamps detachably connected to each other end-to-end to form the coil, the coil having an inner end and an outer end, each of the plurality of stamps comprising:
   a paper layer having a first surface and an opposing second surface;
   a starch layer disposed on the first surface of said paper layer;
   a pressure sensitive adhesive layer adhered to said starch layer;
   a backing layer applied to said adhesive layer only if the stamp is within an area adjacent to the inner end of the coil, there being no backing layer applied if the stamp is within areas not so adjacent to the inner end of the coil;
   an ink layer disposed on at least portions of the second surface of said paper layer;
   a primer layer disposed on said ink layer and on any portions of the second surface of said paper layer not having said ink layer disposed thereon;
   a silicone layer disposed on said primer layer; and
   wherein said primer layer is at least partially absorbed by any portions of the second surface of said paper layer upon which said primer layer is disposed, whereby said paper layer is sealed, and wherein substantially none of said silicone layer is absorbed by said paper layer.

7. A coil of stamps comprising;
   a plurality of self-adhesive stamps detachably connected to each other end-to-end to form a continuous strip of stamps, said strip being wound about itself in spiral-like fashion, and having an inner end and an outer end; and
   wherein said strip of stamps comprises a portion adjacent to the inner end of the strip having a piece of liner material disposed thereon, and a portion having no liner material thereon, whereby the portion having no liner material thereon allows said strip to be wound directly onto itself.

8. The coil of stamps of claim 7 wherein said strip of stamps further comprises a portion adjacent to the outer end of the strip having a piece of liner material disposed thereon in order to facilitate removal of the first stamp or group of stamps from said strip of stamps.

9. The coil of stamps of claim 7 wherein each of the plurality of self-adhesive stamps comprises:
   a paper layer having a first surface and an opposing second surface;
   a pressure sensitive adhesive layer adhered to the first surface of said paper layer;
   an ink layer disposed on at least portions of the second surface of said paper layer;
   a primer layer disposed on said ink layer and on any portions of the second surface of said paper layer not having said ink layer disposed thereon; and
   a silicone layer disposed on said primer layer.

10. The coil of stamps of claim 9 wherein each of the plurality of self-adhesive stamps further comprises a starch layer disposed between the first surface of said paper layer and said pressure sensitive adhesive layer.

11. The coil of stamps of claim 9 wherein said primer layer is at least partially absorbed by any portions of the second surface of said paper layer upon which said primer layer is disposed, whereby said paper layer is sealed.

12. The coil of stamps of claim 9 wherein substantially none of said silicone layer is absorbed by said paper layer.

13. A coil of stamps comprising;
   a plurality of self-adhesive stamps detachably connected to each other end-to-end to form a continuous strip of stamps, said strip being wound about itself in spiral-like fashion, and having an inner end and an outer end, each of said plurality of stamps comprising:
   a paper layer having a first surface and an opposing second surface;
   a starch layer disposed on the first surface of said paper layer;
   a pressure sensitive adhesive layer adhered to said starch layer;
   an ink layer disposed on at least portions of the second surface of said paper layer;
   a primer layer disposed on said ink layer and on any portions of the second surface of said paper layer not having said ink layer disposed thereon;
   a silicone layer disposed on said primer layer;
   wherein said primer layer is at least partially absorbed by any portions of the second surface of said paper layer upon which said primer layer is disposed, whereby said paper layer is sealed, and wherein substantially none of said silicone layer is absorbed by said paper layer; and
   wherein said strip of stamps comprises a portion adjacent to the inner end of the strip having a piece of liner material disposed thereon, a portion adjacent to the outer end of the strip having a piece of liner material disposed thereon and a portion having no liner material thereon, whereby the portion having no liner material thereon allows said strip to be wound directly onto itself.

14. A method for creating a coil of stamps formed from a plurality of stamps detachably connected to each other end-to-end to form the coil, the coil having an inner end and an outer end, said method comprising the steps of:

providing a paper layer having a first surface and an opposing second surface;

adhering an adhesive layer to the first surface of the paper layer;

applying a backing layer to the adhesive layer only in an area of the coil adjacent to the inner end of the coil, there being no backing layer applied to areas of the coil not so adjacent to the inner end of the coil;

disposing an ink layer on at least portions of the second surface of the paper layer;

disposing a primer layer on the ink layer and on any portions of the second surface of the paper layer not having the ink layer disposed thereon; and disposing a silicone layer on the primer layer.

15. The method of claim 14 further comprising the step of disposing a starch layer between the first surface of the paper layer and the adhesive layer.

16. The method of claim 14 wherein the adhesive layer comprises a pressure sensitive adhesive layer.

17. The method of claim 14 wherein the primer layer is at least partially absorbed by any portions of the second surface of the paper layer upon which the primer layer is disposed, whereby the paper layer is sealed.

18. The method of claim 14 wherein substantially none of the silicone layer is absorbed by the paper layer.

19. A method for creating a coil of stamps formed from a plurality of stamps detachably connected to each other end-to-end to form the coil, the coil having an inner end and an outer end, said method comprising the steps of:

providing a paper layer having a first surface and an opposing second surface;

disposing a starch layer on the first surface of the paper layer;

adhering a pressure sensitive adhesive layer to the starch layer;

applying a backing layer to the adhesive layer only in an area of the coil adjacent to the inner end of the coil, there being no backing layer applied to areas of the coil not so adjacent to the inner end of the coil;

disposing an ink layer on at least portions of the second surface of the paper layer;

disposing a primer layer on the ink layer and on any portions of the second surface of the paper layer not having the ink layer disposed thereon;

disposing a silicone layer on the primer layer; and wherein the primer layer is at least partially absorbed by any portions of the second surface of the paper layer upon which the primer layer is disposed, whereby the paper layer is sealed, and wherein substantially none of the silicone layer is absorbed by the paper layer.

* * * * *